(12) United States Patent
Luhm

(10) Patent No.: US 6,772,500 B2
(45) Date of Patent: Aug. 10, 2004

(54) METHOD OF FORMING HOLES FOR PERMANENT FASTENERS

(75) Inventor: Ralph Luhm, La Habra Heights, CA (US)

(73) Assignee: Allfast Fastening Systems, Inc., City of Industry, CA (US)

( * ) Notice: Subject to any disclaimer, the term of this patent is extended or adjusted under 35 U.S.C. 154(b) by 258 days.

(21) Appl. No.: 09/989,834

(22) Filed: Nov. 20, 2001

(65) Prior Publication Data
US 2003/0093890 A1 May 22, 2003

Related U.S. Application Data
(60) Provisional application No. 60/350,167, filed on Oct. 25, 2001.

(51) Int. Cl.[7] .......................... B21J 15/02; B23P 17/00; B23P 19/02
(52) U.S. Cl. ................. 29/525.05; 29/525.06; 29/525.01; 29/426.4
(58) Field of Search .................. 29/525.05, 525.06, 29/525.01, 426.1, 426.4, 426.5, 437; 411/361, 411, 436; 408/112, 84

(56) References Cited

U.S. PATENT DOCUMENTS

| | | | |
|---|---|---|---|
| 1,023,002 A | * | 4/1912 | Bennett .................. 408/112 |
| 1,120,411 A | | 12/1914 | Rohmer |
| 1,941,551 A | | 2/1934 | Gjertsen |
| RE20,055 E | | 8/1936 | Huck |
| 2,061,628 A | | 11/1936 | Huck |
| RE21,058 E | | 4/1939 | Huck |
| 2,385,886 A | | 10/1945 | Shaff |
| 2,536,353 A | | 1/1951 | Cooper |
| 2,538,623 A | | 1/1951 | Keating |
| 2,545,752 A | | 3/1951 | Singleton |
| 2,546,602 A | | 3/1951 | Keating |
| 2,652,741 A | | 9/1953 | Ketchum et al. |
| 2,756,624 A | | 7/1956 | Austin |
| 3,038,626 A | | 6/1962 | Simmons |
| 3,178,989 A | | 4/1965 | Siebol |
| 3,257,890 A | | 6/1966 | Kraemer |
| 3,285,121 A | | 11/1966 | Siebol |
| 3,292,482 A | | 12/1966 | Fry et al. |
| 3,300,798 A | | 1/1967 | York |
| 3,309,747 A | | 3/1967 | Smith |
| 3,348,444 A | | 10/1967 | Brignola |
| 3,371,572 A | * | 3/1968 | King, Jr. .................. 411/361 |
| 3,515,419 A | | 6/1970 | Baugh |
| 3,553,040 A | | 1/1971 | Bell |
| 3,643,544 A | | 2/1972 | Massa |
| 3,657,957 A | | 4/1972 | Siebol |
| 3,880,042 A | | 4/1975 | Binns |
| 3,937,123 A | | 2/1976 | Matuschek et al. |
| 4,044,591 A | | 8/1977 | Powderley |
| 4,074,608 A | | 2/1978 | Siebol |
| 4,089,249 A | | 5/1978 | Binns |
| 4,137,817 A | | 2/1979 | Siebol |
| 4,168,650 A | | 9/1979 | Dahl et al. |
| 4,170,919 A | | 10/1979 | Siebol |
| 4,170,920 A | | 10/1979 | Siebol |
| 4,198,895 A | | 4/1980 | Ruhl |
| 4,211,145 A | | 7/1980 | Dolch |

(List continued on next page.)

Primary Examiner—John C. Hong
(74) Attorney, Agent, or Firm—Blakely, Sokoloff, Taylor & Zafman LLP

(57) ABSTRACT

Two piece tack rivets and method of forming holes for permanent fasteners. The tack rivets have a stem with a head on one end and a grooved region adjacent the other end, and a locking collar for fitting over the grooved region of the stem for deforming into the grooved region of the stem on applying a setting force between the locking collar and the stem. Once the rivet is set, the rivet may be later drilled out with a drill larger in diameter than the head of the stem. Various embodiments are disclosed.

32 Claims, 4 Drawing Sheets

U.S. PATENT DOCUMENTS

| | | | |
|---|---|---|---|
| 4,222,304 | A | 9/1980 | Yoshida et al. |
| 4,230,017 | A | 10/1980 | Agnelosanto |
| 4,261,245 | A | 4/1981 | Mauer |
| 4,293,258 | A | 10/1981 | McKewan |
| 4,312,613 | A | 1/1982 | Binns |
| 4,342,529 | A | 8/1982 | Smith |
| 4,355,934 | A | 10/1982 | Denham et al. |
| 4,364,697 | A | 12/1982 | Binns |
| 4,367,994 | A | 1/1983 | Francis et al. |
| 4,370,081 | A | 1/1983 | Briles |
| 4,388,031 | A | 7/1983 | Rodgers |
| 4,407,619 | A | 10/1983 | Siebol |
| 4,437,805 | A | 3/1984 | Smith |
| 4,451,189 | A | 5/1984 | Pratt |
| 4,473,914 | A | 10/1984 | Haft |
| 4,540,447 | A | 9/1985 | Mercer |
| 4,556,351 | A | 12/1985 | Wollar et al. |
| 4,579,491 | A | 4/1986 | Kull |
| 4,580,936 | A | 4/1986 | Francis et al. |
| 4,585,383 | A | 4/1986 | Kraemer |
| 4,609,315 | A | 9/1986 | Briles |
| 4,609,317 | A | 9/1986 | Dixon et al. |
| 4,615,655 | A | 10/1986 | Dixon |
| 4,620,825 | A | 11/1986 | Potzas |
| 4,627,775 | A | 12/1986 | Dixon |
| 4,639,174 | A | 1/1987 | Denham et al. |
| 4,678,384 | A | 7/1987 | Sparling et al. |
| 4,696,610 | A | 9/1987 | Wright |
| 4,702,655 | A | 10/1987 | Kendall |
| 4,736,560 | A | 4/1988 | Murphy |
| 4,765,787 | A | 8/1988 | Briles |
| 4,781,500 | A | 11/1988 | Mauer |
| 4,781,501 | A | 11/1988 | Jeal et al. |
| 4,784,551 | A | 11/1988 | Kendall |
| 4,789,283 | A | 12/1988 | Crawford |
| 4,826,372 | A | 5/1989 | Kendall |
| 4,836,728 | A | | 6/1989 | Mauer et al. |
| 4,850,771 | A | | 7/1989 | Hurd |
| 4,852,376 | A | | 8/1989 | Suhov |
| 4,859,128 | A | | 8/1989 | Brecz et al. |
| 4,863,325 | A | | 9/1989 | Smith |
| 4,865,499 | A | | 9/1989 | Lacey |
| 4,867,625 | A | * | 9/1989 | Dixon ........................ 411/361 |
| 4,877,363 | A | | 10/1989 | Williamson et al. |
| 4,900,205 | A | | 2/1990 | Sadri |
| 4,909,687 | A | | 3/1990 | Bradley et al. |
| 4,919,576 | A | | 4/1990 | Louw et al. |
| 4,950,115 | A | | 8/1990 | Sadri |
| 4,958,971 | A | | 9/1990 | Lacey et al. |
| 4,968,198 | A | | 11/1990 | Binns |
| 4,988,247 | A | | 1/1991 | Summerlin |
| 4,990,042 | A | | 2/1991 | Szayer et al. |
| 5,006,024 | A | | 4/1991 | Siebol |
| 5,030,050 | A | | 7/1991 | Auriol et al. |
| 5,044,850 | A | | 9/1991 | Getten et al. |
| 5,049,016 | A | | 9/1991 | Nordyke |
| 5,052,870 | A | | 10/1991 | Pratt et al. |
| 5,125,778 | A | | 6/1992 | Sadri |
| 5,135,340 | A | | 8/1992 | Stinson |
| 5,141,373 | A | | 8/1992 | Kendall |
| 5,171,115 | A | | 12/1992 | McWilliams et al. |
| 5,197,838 | A | | 3/1993 | Schwab |
| 5,315,755 | A | | 5/1994 | Fulbright et al. |
| 5,320,456 | A | | 6/1994 | Smith |
| 5,346,348 | A | | 9/1994 | Denham |
| 5,548,889 | A | | 8/1996 | Smith et al. |
| 5,604,968 | A | | 2/1997 | Fulbright et al. |
| 5,869,873 | A | | 2/1999 | Luhm |
| 6,014,801 | A | | 1/2000 | Wilcox |
| 6,233,802 | B1 | | 5/2001 | Fulbright |
| 6,325,582 | B1 | | 12/2001 | Sadri et al. |

\* cited by examiner

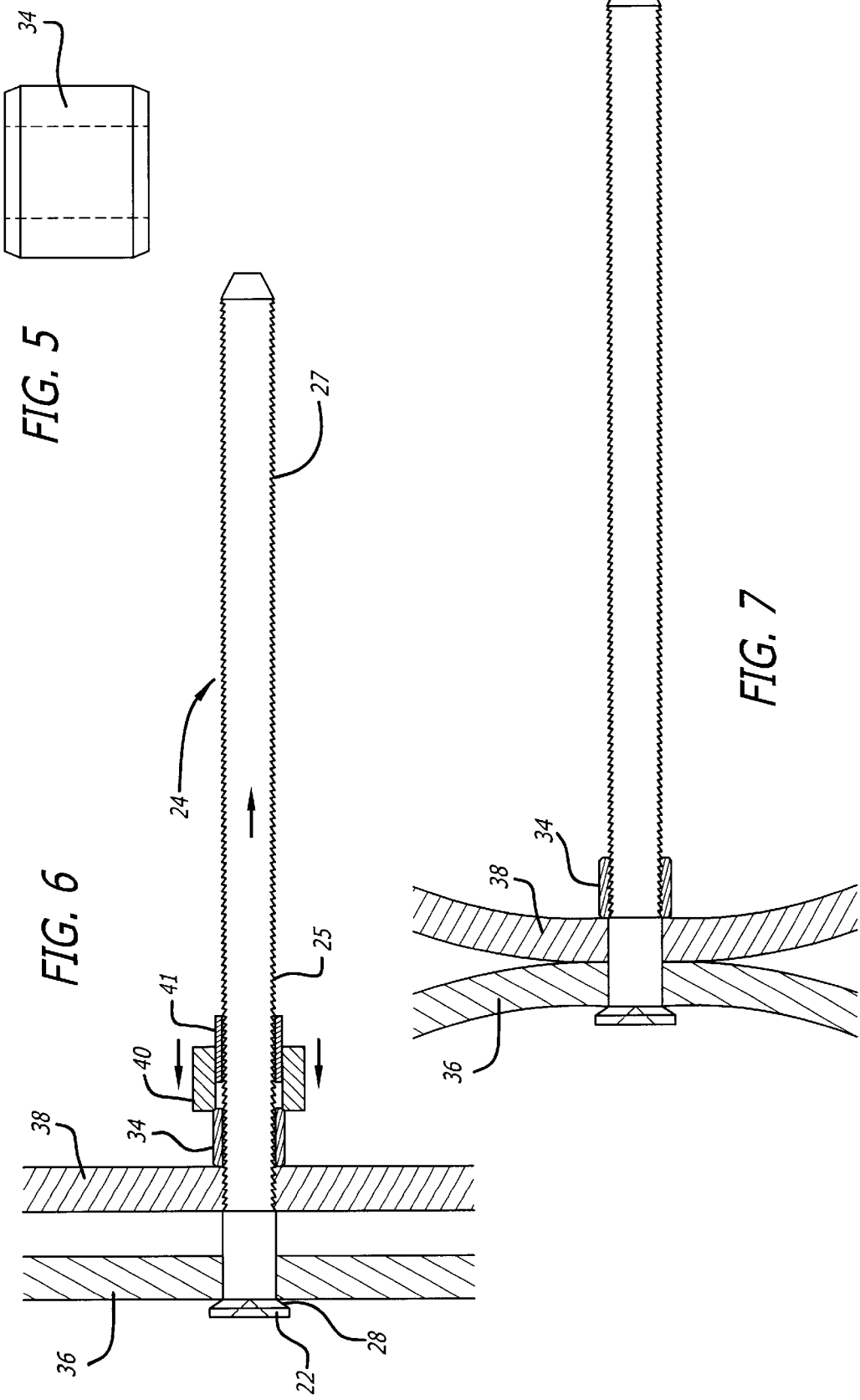

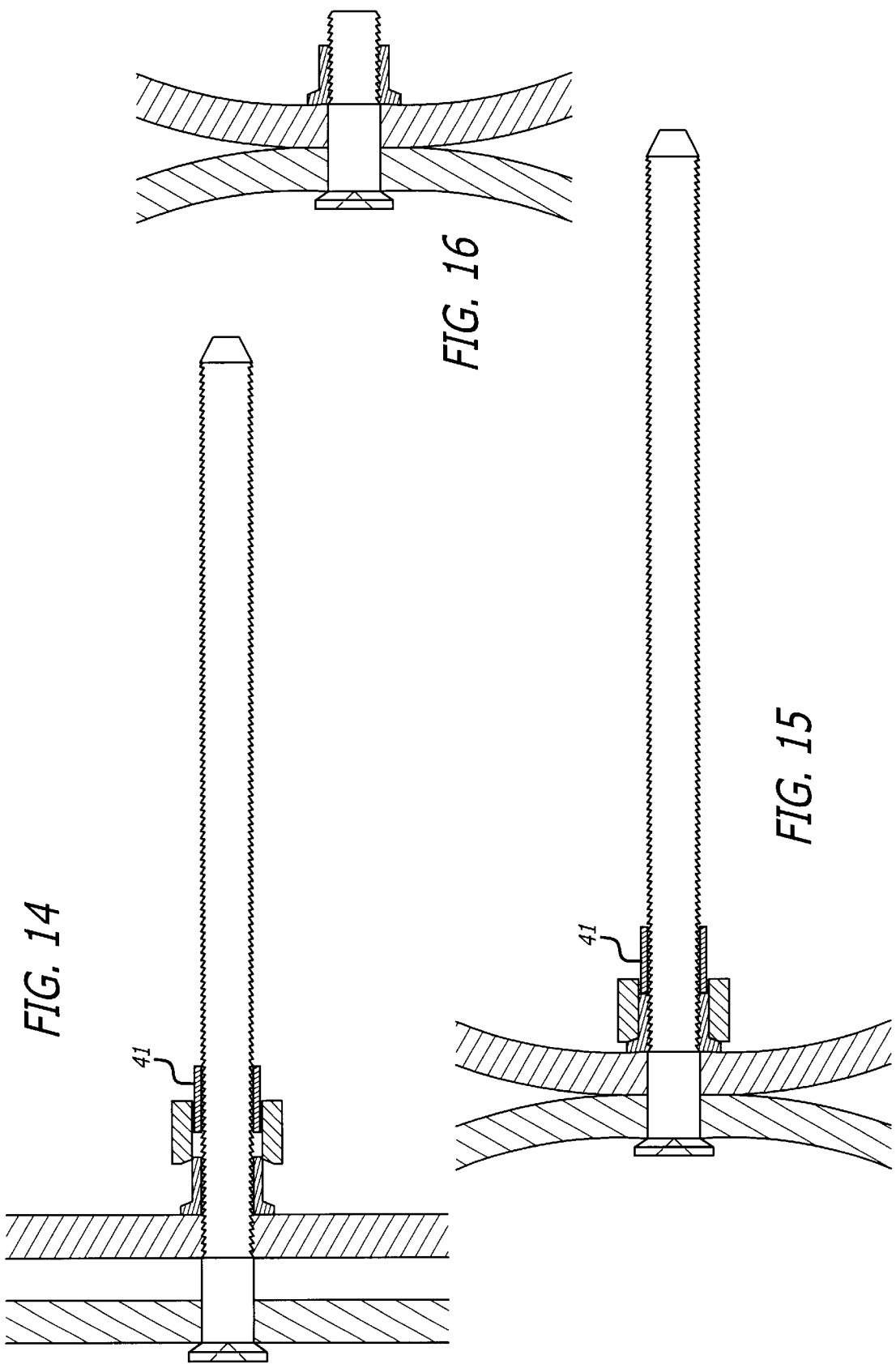

METHOD OF FORMING HOLES FOR PERMANENT FASTENERS

CROSS-REFERENCE TO RELATED APPLICATIONS

This application claims the benefit of U.S. Provisional Patent Application No. 60/350,167 filed on Oct. 25, 2001.

BACKGROUND OF THE INVENTION

1. Field of the Invention

The present invention relates to the field of temporary fasteners, as are typically used to hold work pieces together while permanent fasteners are installed.

2. Prior Art

Temporary fasteners are frequently used in manufacturing to hold work pieces together while permanent fasteners are installed. Such fasteners are installed in a few holes in the work pieces to align and pull the parts together that are to be joined so that permanent fasteners may be installed in the remaining holes, after which the temporary fasteners are removed for installation of permanent fasteners in these holes also.

Ideal temporary fasteners may have various characteristics, depending on their application. In general, as previously mentioned, temporary fasteners are intended to align and pull the parts together so that permanent fasteners may be installed. Consequently, a temporary fastener should have the capability of pulling together work pieces that may initially have a substantial separation (commonly referred to as "sheet takeup"), so that the installer does not have to resort to other means to pull the work pieces together sufficiently to properly install the temporary fastener.

Also, while the work pieces will not be subjected to the same loads they may encounter in use after the permanent fasteners are installed, the temporary fasteners typically will only be installed in a small percentage of the fastener holes in the work pieces, such as every tenth hole or so. This, plus a desired large and strong sheet takeup capability, makes temporary fastener strength an important parameter.

Other important parameters for temporary fasteners include low fastener cost, and ease of installation and removal. Simplicity of fastener design and assembly, together with a simple installation operation contributes to low cost and ease of operation, as does a large and strong sheet takeup capability. Removal of temporary fasteners varies with the fastener design, some fasteners being disassembled for removal and others being drilled out for removal. Drilling out of temporary fasteners is perfectly acceptable and may be a favored method of temporary fastener removal, provided the fastener is a low cost fastener and the drilling operation itself doesn't foster other complications.

In some applications, temporary fasteners must be installable and removable with access to only one side of the work pieces. Fasteners of this type, such as disclosed in U.S. Pat. No. 5,689,873 entitled "Tacking Fastener" and assigned to the assignee of the present invention, are referred to as blind temporary fasteners. The present invention is intended for use in applications where access to both sides of the work pieces is available.

BRIEF SUMMARY OF THE INVENTION

Two piece tack rivets and method of forming holes for permanent fasteners are disclosed. The tack rivets have a stem with a head on one end and a grooved region adjacent the other end, and a locking collar for fitting over the grooved region of the stem for deforming into the grooved region of the stem on applying a setting force between the locking collar and the stem. The stem is placed through a hole in the work pieces, the locking collar is put over the stem portion protruding from the other side of the work pieces, and the setting force is applied. Once the rivet is set, the rivet may be later drilled out with a drill larger in diameter than the head of the stem to form the hole for the permanent fastener. Various embodiments are disclosed.

BRIEF DESCRIPTION OF THE DRAWINGS

FIG. 5 illustrates one embodiment of the locking collar for the two piece tack rivets of the present invention.

FIG. 6 is a partial cross section of the tacking rivet of the present invention passing through complimentary holes in work pieces.

FIG. 7 is a partial cross section of a finally set rivet of the present invention before stem fracture occurs.

FIG. 14 illustrates the assembly of a tack rivet using the locking collar of FIG. 13 before setting the rivet.

FIG. 15 illustrates the tack rivet of FIG. 14 after setting and before stem fracture.

FIG. 16 illustrates the tack rivet of FIG. 14 after setting and after stem fracture.

DETAILED DESCRIPTION OF THE PREFERRED EMBODIMENTS

Figure 1:
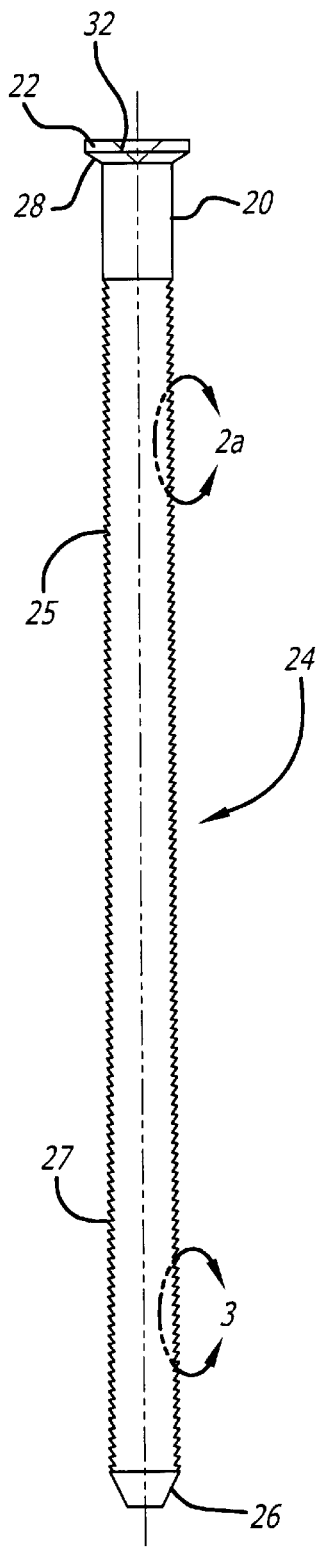
FIG. 1 illustrates one embodiment of the stem for the tack rivet of one embodiment of the present invention.

There is disclosed herein two piece tack rivets having excellent sheet takeup and higher strength than other tack rivets, and which tack rivets are easily drilled out for installation of permanent rivets.

The two piece tack rivets of the present invention comprise a stem and a collar. One embodiment of the stem for the tack rivet of the present invention may be seen in FIG. 1. As shown therein, the stem is characterized by a cylindrical section 20, a head 22 and a grooved stem region generally indicated by the numeral 24, terminating at the lower end thereof at a tapered stem tip 26. The grooved stem region 24 is characterized by a first stem region 25 adjacent to the cylindrical section 20, illustrated in FIG. 2a, and a second stem region 27 illustrated in FIG. 3 between the first stem region and the tapered stem tip 26. In particular, as illustrated in the detail of FIG. 2a, the first stem region is preferably characterized by circular grooves having a shape for good gripping of a cylindrical collar forced thereinto, and resistance to movement of the collar along the stem in a direction toward the stem tip 26. Of course the specific configuration of the circular grooves shown in FIG. 2a may be varied as desired, with one alternate shape of the grooves illustrated in FIG. 2b. These, however, are representative only, as other shapes may be used as desired.

Figure 2A:
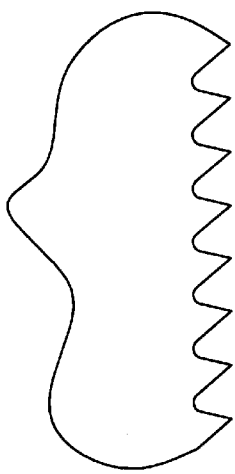
FIG. 2a illustrates one configuration for the grooved stem region 24 of the stem embodiment of FIG. 1.
Figure 2B:
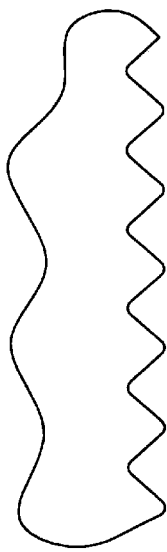
FIG. 2b illustrates one alternate configuration for the grooved stem region 24 of the stem embodiment of FIG.
Figure 3:
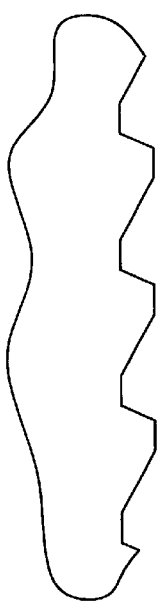
FIG. 3 illustrates one configuration for the grooved stem region 27 of the stem embodiment of FIG. 1.

One configuration for the shape of the second stem region is illustrated in the detail of FIG. 3, which preferably has a shape corresponding to that generally used for a blind rivet stem so that the same may be gripped for pulling with conventional blind rivet pulling heads. Obviously here too, other shapes may be used as desired. In the preferred embodiments, the diameter over the pulling grooves (FIG. 3) on the second stem region 27, and particularly the diameter over the grooves in the first stem region 25, is approximately equal or only slightly less than the diameter of the cylindrical section 20 adjacent the head of the tack rivet stem. The minor diameter on the circular grooves in the first stem region 25 (FIG. 2a or FIG. 2b, for example) is preferably less than minor diameter in the circular grooves in the second stem region 27, the function of which diameter difference shall be subsequently described. While the surfaces of the first and second stem regions may be other than configured as circular grooves, circular grooves are preferred as being easily and accurately formed by conventional rolling processes.

Now referring to FIG. 5, one embodiment of the locking collar for the two piece tack rivets of the present invention may be seen. This embodiment for the locking collar is a simple, hollow cylindrical member 34 having a loose slip fit over the stem 24 and the cylindrical section 20 of the stem shown in FIG. 1. In the preferred embodiment, both ends of the collar 34 have a slight taper, though use of the taper is optional. Preferably, though not necessarily, both ends of the collar will be of the same configuration, tapered or not, to make the collar symmetrical to avoid the need to properly endwise orient the collar on the stem.

Now referring to FIG. 6, a partial cross section of the tacking rivet of the present invention passing through complimentary holes in work pieces 36 and 38 may be seen. As shown therein, the taper 28 on the head 22 of the stem rests against the surface of one work piece, while the second work piece is shown separated from the first work piece by a substantial spacing to emphasize the sheet takeup capability of the present invention. Also shown in the Figure is the collar 34 of FIG. 5 as slid over the stem 24 and positioned against the second work piece. A pulling head, substantially the same as used to pull blind rivets, on a rivet installation tool fitted with a special hollow anvil 40 grips the second or gripping region 27 of the stem, and exerts a force between the stem and the anvil. This causes the anvil, which has a smaller inner diameter than the outer diameter of the collar 34, to first slide the collar toward the head of the stem to draw the work pieces together with substantial force, and to thereafter slide over the collar to deflect or extrude the material thereof inward into the circular grooves in the first stem region 25. (The collar outer diameter, the anvil inner diameter, or preferably both, may have a chamfer or taper on the end thereof to assist in this action.) Ultimately when the collar is positively locked into the circular grooves in the first region of the stem, the anvil may contact the second work piece. The pulling force will continue to rise until the second stem region (the pulling portion) fractures. Because the minor diameter of the grooves in the first stem region 25 is less than the minor diameter of the grooves in the pulling portion of the stem 27, the stem will fracture somewhere in the first stem region 25. Also, because the collar as extruded over the grooves in part of the first stem region in the set rivet tend to reinforce that region, the break will occur somewhere between the distal end of the set collar and the junction between the first stem region and the second stem region. Preferably the difference in minor diameters is in the range of 5% to 15%, and more preferably approximately 8% to 10%. Once the pulling action is complete, an ejection sleeve 41 will move forward to contact the set sleeve 34, after which the anvil 40, now fitting tightly over the sleeve, will be retracted, followed by the retraction of the ejection sleeve itself.

Figure 8:
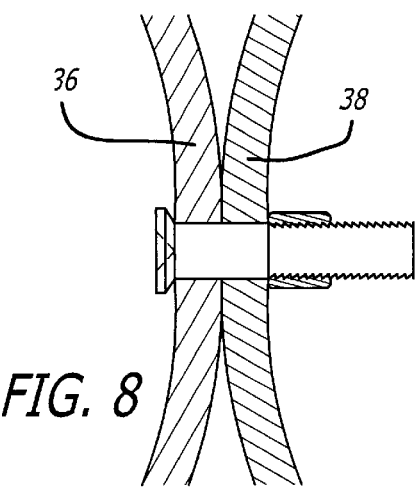
FIG. 8 is a partial cross section of a finally set rivet of the present invention after stem fracture occurs.

The finally set rivet before stem fracture is shown in FIG. 7, and after stem fracture in FIG. 8. In these Figures, the work pieces are shown curved for emphasis of the sheet takeup capabilities of the present invention, both in the amount of sheet takeup and in the force of the sheet takeup. In that regard, in one preferred embodiment, the rivet stem is ⅛ inches in diameter and 2.5 inches long, with the second stem region 27 (the pulling portion) having a minor diameter in the grooves of approximately 0.109 inches and extending ⅞ inches from the tapered tip of the stem. (The first stem region in that embodiment has a minor diameter of approximately 0.100 inches.) This provides a grip range for the rivet of ⅜ inches to 1.5 inches. While FIGS. 7 and 8 show only the cylindrical section 20 of the stem (FIG. 1) in the hole in the work pieces in the finished assembly, part of the circular grooved region of the first stem region 25, and a substantial part at that, may also be in the hole in the work pieces by the time the rivet is set, depending on the total thickness of the work pieces within the grip range.

One of the advantages of the present invention over certain other tack rivets is their increased strength for their size. While the present invention stems are preferably rolled parts of 2017, 2024, 7050 or 7075 aluminum alloy, and the collars are preferably 2017, 2117, 2024 or 5056 aluminum alloy, the additional strength comes from the fact that the stems are solid, whereas certain other tack rivets are blind rivets, leaving the set rivet with only a hollow shank filling the hole in the work pieces. Another advantage of the present invention arises from the tapered distal end on the stem, allowing the installer to more easily insert the rivet into the hole in the work pieces, and even to help finally align the work pieces through action of the taper being pushed through the hole in the first work piece and into the hole in the subsequent work piece or pieces.

Figure 9:
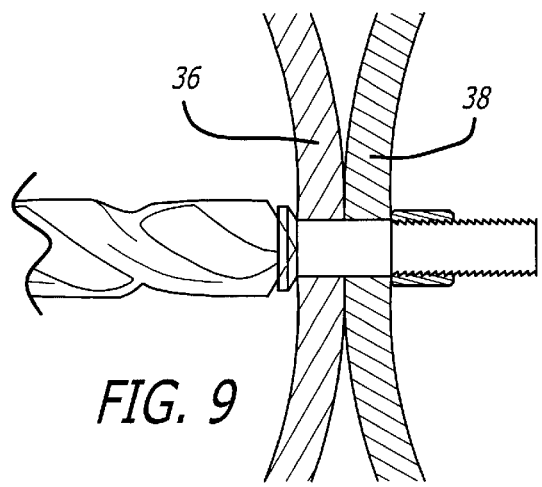
FIG. 9 illustrates the use of a drill larger in diameter than the head of the temporary rivet for rivet removal.

It will be noted from the Figures, such as FIG. 1, that the head of the stem includes a central depression. This is a drill centering depression for drilling out the tacking fastener, typically after permanent fasteners have been installed in adjacent fastener holes in the work pieces. For this purpose, preferably a drill larger in diameter than the head of the rivet is used, as illustrated in FIG. 9. If the included angle of the taper of the drill is larger than the included angle of the taper on the head 22 of the stem (FIG. 1), the drill will remove all of the head material before engaging the first work piece, avoiding any possibility of the drill tip grabbing a remaining head segment and spinning the same on the surface of first work piece.

Figure 4:
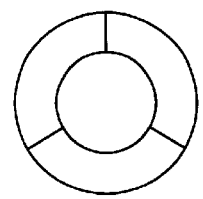
FIG. 4 illustrates outwardly projecting ridges on the taper 28 on the head 22 of the stem embodiment of FIG. 1 as one exemplary technique to discourage rivet head spinning during drill-out.

In a preferred embodiment, to avoid the possibility of the drill grabbing the head and spinning the entire rivet rather than drilling it out, the taper 28 on the head 22 of the stem (FIG. 1) has outwardly projecting ridges, as shown in FIG. 4 (three being shown therein, though any number, including a large number resembling a spline-like surface could be used), to better grip the first work piece and prevent such spinners. Alternatively, or in addition, other spin prevention embellishments may be incorporated, such as knurling of the cylindrical section 20 so that it has a tight fit in the holes in the work pieces to grip the same to also resist spinning.

Figure 10:
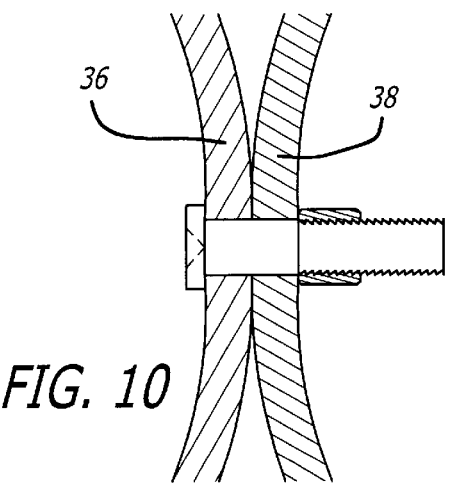
FIGS. 10, 11 and 12 illustrate exemplary alternate rivet head shapes.
Figure 11:
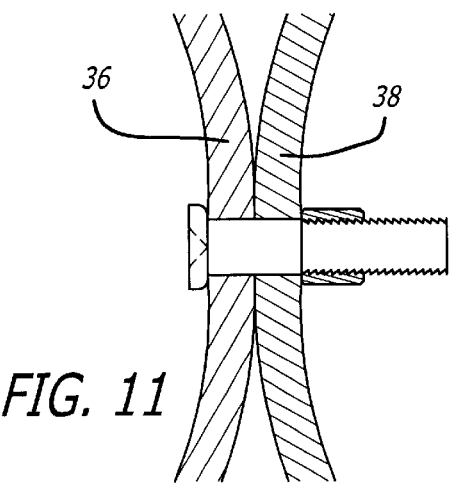
Figure 12:
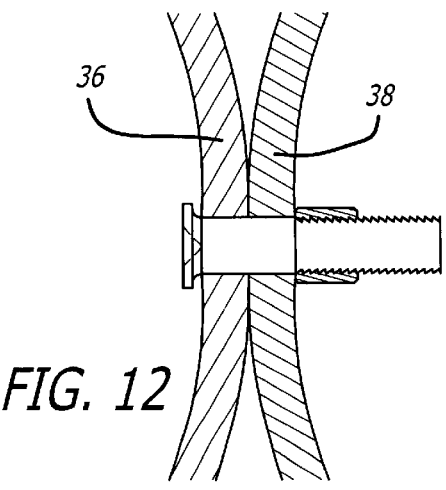

The tapered stem head shown on FIG. 1 is preferred because of its ability to be entirely drilled away before the drill starts drilling into the work pieces. However the present invention may be practiced with other head shapes. The head may be cylindrical such as shown in FIG. 10. The head may have other curved shapes. FIG. 11 shows an exemplary head that provides a chamfered transition between the head and the stem. FIG. 12 shows an exemplary head that provides a filleted transition between the head and the stem. The head may even be dome headed. Regardless of the head shape, the head most preferably has a coaxial drill centering depression for drill alignment and drill wander minimizing purposes.

The work piece facing surface of any stem head shape may be ribbed as previous described with respect to FIG. 4, or even have a surface similar to a knurled surface for spin resistance. As a further alternative, the stem adjacent the head may have, instead or in addition, a few ribs, or even a spline-like surface texture for positive engagement by way of a tight fit into the hole in at least the outer work piece to prevent spinning. Note that on removal of the tack rivet, once the head is drilled away and the drill is centered on the hole in the outer work piece, spinning of the remainder of the rivet is of no consequence, as it will simply be pushed out of the work pieces as the drill advances through the work pieces.

Figure 13:
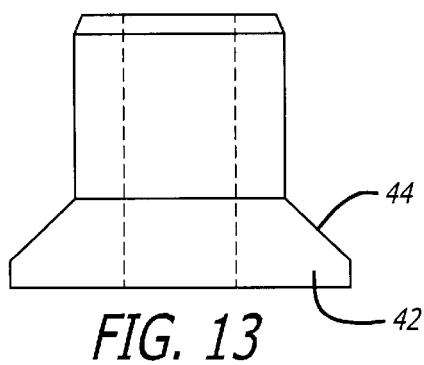
FIG. 13 shows an exemplary alternate embodiment of locking collar that may be used with the present invention.

Similarly, other parts or sections of the invention may be reconfigured as desired for the intended purpose. By way of a further example, the locking collar may be configured as shown in FIG. 13. In this embodiment, one end of the collar may be the same as for the embodiment of FIG. 5, while the other end is provided with a flange or head-like protrusion. In use, the stem is put in position through the holes in the work pieces, the collar is slid over the stem with the flange against the surface of the adjacent work piece as shown in FIG. 14, and the pulling tool or gun then applied and the rivet pulled. This way, the anvil on the pulling tool continues to force the collar against the work piece (FIG. 15) until the stem fractures (FIG. 16), whereas the final fracturing force for the earlier described embodiment comes from the anvil pressing against one of the work pieces. Preferably in this latter embodiment, the flange 42 has an angled or conical surface 44, with the anvil on the pulling tool being angled in a complimentary manner so that the final stem fracturing force also provides a final squeeze or compression force enhancing the collar locking action immediately adjacent the work pieces. While this embodiment makes the collar operation end-to-end orientation dependent, the collar is more than sufficiently unsymmetrical to allow an installer to feel the difference for proper installation without diverting his attention to look at the collar.

While preferred embodiments of the present invention have been disclosed herein, such disclosure is only for purposes of understanding exemplary embodiments and not by way of limitation of the invention. It will be obvious to those skilled in the art that various changes in form and detail may be made in the invention without departing from the spirit and scope of the invention.

What is claimed is:

1. A method for creating a hole for a permanent fastener to fasten work pieces together, comprising:

a) providing a tacking fastener comprising a stem having a first end and a second end, the first end having a head thereon, the stem including a grooved portion extending toward the second end, the tacking fastener further comprising a locking collar having an inner diameter to slip over the second end of the stem;

b) drilling a first hole through the work pieces;

c) inserting the stem into the first hole from a first side of the work pieces so that the stem extends from a second side of the work pieces and the head is adjacent the first side of the work piece;

d) placing the locking collar over the stem extending from the second side of the work pieces and adjacent the second side of the work pieces so that a portion of the stem extends out of the locking collar;

e) applying a setting force between the stem portion extending out of the locking collar and the locking collar to force the work pieces together and to lock the locking collar to the grooved portion of the stem by deforming the collar into the grooved portion of the stem; and, f) drilling the head, the stem and the work pieces with a drill bit that has a diameter larger than a diameter of the head on the stem.

2. The method of claim 1 wherein the head has a drill centering depression thereon, and wherein drilling the head, the shank and the work pieces with a drill bit that has a diameter larger than a diameter of the head on the stem is accomplished by first centering the drill in the drill centering depression in the head of the stem.

3. The method of claim 2 wherein the setting force is increased after locking the locking collar to the grooved portion of the stem to fracture the stem at a location between the locking collar and the second end of the stem.

4. The method of claim 3 wherein the grooved portion of the stem is comprised of first and second grooved portions, the first grooved portion extending to the second end of the stem and being adapted for engagement by a pulling head, the second grooved portion extending along the stem to the first grooved portion and being adapted to grasp the locking collar when the locking collar is deformed thereinto.

5. The method of claim 4 wherein the second grooved portion has a smaller minor diameter than the first grooved portion, the method further comprising fracturing the stem in the second grooved portion of the stem at a location between the locking collar and the first grooved portion.

6. The method of claim 2 wherein the head on the stem has a conical shape.

7. The method of claim 6 wherein the conical head has a first included angle that is smaller than a second included angle of the drill used to drill the head.

8. The method of claim 2 wherein the head on the stem has a cylindrical shape.

9. The method of claim 2 wherein the second end of the stem is tapered.

10. The method of claim 2 wherein the grooved portion of the stem is comprised of first and second grooved portions, the first grooved portion extending to the second end of the stem and being adapted for engagement by a pulling head, the second grooved portion extending along the stem to the first grooved portion and being adapted to grasp the locking collar when the locking collar is deformed thereinto.

11. The method of claim 10 wherein the second grooved portion has a smaller minor diameter than the first grooved portion.

12. The method of claim 11 wherein the stem includes a cylindrical portion adjacent the head, the second grooved portion extending to a position adjacent to the cylindrical portion.

13. The method of claim 2 wherein the stem includes a cylindrical portion adjacent the head.

14. The method of claim 2 wherein the surface of the head that contacts the surface of the work pieces is adapted to resist spinning with respect to the work pieces.

15. The method of claim 2 wherein the locking collar is symmetrical, end to end, so that either end of the locking collar may be placed over the stem first.

16. The method of claim 15 wherein both ends of the locking collar have external tapers to assist in deforming the locking collar into the grooves in the stem.

17. The method of claim 2 wherein the locking collar has a flange on a first end, the first end of the locking collar being placed over the stem first to provide a larger load bearing surface against the second side of the work pieces.

18. The method of claim 17 wherein the locking collar has an external taper on a second end thereof.

19. The method of claim 2 wherein the tacking fastener further comprises a chamfered transition between the head and the first end of the stem.

20. The method of claim 2 wherein the tacking fastener further comprises a filleted transition between the head and the first end of the stem.

21. A method for creating a hole of a first diameter for a permanent fastener to fasten work pieces together, comprising:
   a) providing a tacking fastener comprising a stem having a first end and a second end, the first end having a head thereon larger in diameter than the stem and smaller in diameter than the first diameter, the surface of the head having a drill centering depression therein, the stem having a cylindrical portion adjacent the head, a first grooved portion extending toward the second end and a second grooved portion extending between the cylindrical portion and the first portion, the first grooved portion being adapted to engage a pulling head, the second grooved portion having a minor diameter of less than the first grooved portion and adapted to grasp a locking collar when deformed thereinto, the tacking fastener further comprising a locking collar having an inner diameter to slip over the second end of the stem;
   b) drilling a first hole through the work pieces having a diameter equal to the diameter of the cylindrical portion of the stem;
   c) inserting the stem into the first hole from a first side of the work pieces so that the stem extends from a second side of the work pieces and the head is adjacent to the first side of the work pieces;
   d) placing the locking collar over the stem portion extending from the second side of the work pieces and adjacent the second side of the work pieces so that a portion of the stem extends out of the locking collar;
   e) applying a setting force between the stem portion extending out of the locking collar and the locking collar to force the work pieces together and to lock the locking collar to the second grooved portion of the stem by deforming the collar into the grooves in the second grooved portion of the stem;
   f) increasing the setting force after locking the locking collar to the second grooved portion of the stem to fracture the stem in the second grooved portion at a location between the locking collar and the first grooved portion of the stem; and,
   g) centering a drill in the drill centering depression in the head and drilling the head, the stem and the work pieces with a drill bit that has a diameter equal to the first diameter.

22. The method of claim 21 wherein the head on the stem has a conical shape.

23. The method of claim 22 wherein the conical head has an included angle less than the drill used to drill the head.

24. The method of claim 21 wherein the head on the stem has a cylindrical shape.

25. The method of claim 21 wherein the second end of the stem is tapered.

26. The method of claim 21 wherein the surface of the head that contacts the surface of the work pieces is adapted to resist spinning with respect to the work pieces.

27. The method of claim 21 wherein the locking collar is symmetrical, end to end, so that either end of the locking collar may be placed over the stem first.

28. The method of claim 27 wherein both ends of the locking collar have external tapers to assist in deforming the locking collar into the grooves in the second grooved portion of the stem.

29. The method of claim 21 wherein the locking collar has a flange on a first end, the first end of the locking collar being placed over the stem first to provide a larger load bearing surface against the second side of the work pieces.

30. The method of claim 29 wherein the locking collar has an external taper on a second end thereof to assist in deforming the locking collar into the grooves in the second grooved portion of the stem.

31. The method of claim 21 wherein the tacking fastener further comprises a chamfered transition between the head and the first end of the stem.

32. The method of claim 21 wherein the tacking fastener further comprises a filleted transition between the head and the first end of the stem.

* * * * *